(12) United States Patent
Tomokane et al.

(10) Patent No.: US 6,665,318 B1
(45) Date of Patent: Dec. 16, 2003

(54) STREAM DECODER

(75) Inventors: Takeo Tomokane, Yokohama (JP); Tetsuya Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/311,364

(22) Filed: May 13, 1999

(30) Foreign Application Priority Data

May 15, 1998 (JP) ............................................. 10-132955

(51) Int. Cl.⁷ ............................................... H04L 12/56
(52) U.S. Cl. ...................................... 370/535; 370/542
(58) Field of Search ............................... 370/535, 534, 370/537, 538, 542; 348/554, 558, 564

(56) References Cited

U.S. PATENT DOCUMENTS

| | | | |
|---|---|---|---|
| 5,212,742 A | * | 5/1993 | Normile et al. |
| 5,706,507 A | | 1/1998 | Schloss |
| 6,092,107 A | * | 7/2000 | Eleftheriadis et al. ...... 709/217 |
| 6,295,380 B1 | * | 9/2001 | Takahashi ................... 382/240 |
| 6,356,661 B1 | * | 3/2002 | Wen .......................... 382/233 |
| 6,377,309 B1 | * | 4/2002 | Ito et al. ..................... 348/554 |

OTHER PUBLICATIONS

Nikkei Electronics, 1997, 9–2, No. 699, pp. 147–168, and English translation.

* cited by examiner

Primary Examiner—Kenneth Vanderpuye
(74) Attorney, Agent, or Firm—Mattingly, Stanger & Malur, P.C.

(57) ABSTRACT

A video stream decoder include: a demultiplexing unit for demultiplexing a video stream containing at least one or more object encoded visual or audio data and one or more scene descriptions which express scene contents by object encoded data; a decoder unit for decoding the object encoded visual data; a decoder unit for decoding the object encoded audio data; a visual synthesizing unit for synthesizing images corresponding to the object encoded visual data; an audio synthesizing unit for synthesizing sounds corresponding to the object encoded audio data; an analyzing unit for analyzing each scene description; a selector for selecting one of at least two or more scene descriptions contained in the video stream.

17 Claims, 7 Drawing Sheets

VIDEO STREAM DECODER

STREAM DECODER

BACKGROUND OF THE INVENTION

1. Field of the Invention

The present invention relates to processing of object encoded data such as moving image data, voice data, text data, still image data, and scene description data. More particularly, the invention relates to a system for transmitting data of a moving image coding type which data can be encoded into one stream, a system for receiving such data, and a decoder for such data. The invention also relates to a computer program for realizing the functions of these systems and decoder.

2. Description of the Related Art

There are many moving image coding schemes. One of most prevailing schemes is MPEG (Moving Picture Experts Group) which is international standards stipulated by ISO/IEC JTC1. Presently, there are two types of MPEG's, MPEG 1 and MPEG 2. MPEG 1 is mainly used for video CD's, the Internet, and the like, whereas MPEG 2 is mainly used for DVD video, digital satellite broadcast and the like.

As the next generation moving image coding scheme, MPEG 4 is now under development. One of major features of MPEG 4 is object coding by which visual data, audio data, text data or the like is processed as an object. For example, background image data and portrait image data are encoded into different image objects which are multiplexed into a MPEG 4 stream as different object encoded data. In decoding the encoded image objects, the MPEG 4 stream is demultiplexed to derive two types of object encoded data, and the encoded data is decoded into two images which may be synthesized to form one scene. In addition to such image objects, various object data such as audio data and text data may be combined freely in various ways to form a scene. In MPEG 4, a scene description (Screen Description) is dealt with as one kind of objects, which defines scene configuration information and a synthesizing method in order to synthesize a scene.

As the format of a scene description of MPEG 4, two formats including BIFS (Binary Format for Scenes) and AAVS (Adaptic Audio-Visual Session Format) based upon VRML (Virtual Reality Modelling Language) will become standards in the near future. In MPEG 4, a scene description can be dynamically changed at a terminal which decodes a MPEG 4 stream, or can be updated interactively by transmitting a message to a terminal from which a MPEG 4 stream was transmitted. These features of MPEG 4 are detailed in "Nikkei Electronics", 1997.9. 22, No. 699, p. 147, p. 168, published by Nikkei BP Company.

As described above, in MPEG 4, a scene description of a video stream can be changed when the stream is decoded. However, if a video stream of MPEG 4 is broadcast to a number of unidentified terminals and if user interface for changing the scene description is provided to all terminals, the user interface becomes complicated and the cost of each terminal rises.

A parent control over programs has drawn attention nowadays. Now in U.S.A., a TV program list explicitly declares a presence of scenes unfavorable from the educational viewpoint, such as violence scenes, to thereby allow parents to control whether the children are permitted to look and listen to such a program.

However, if the parents are not present at that time, the control is impossible.

There is another problem that images not intended by a copyright holder are formed easily by a user because the scene description can be edited freely.

SUMMARY OF THE INVENTION

It is an object of the present invention to allow a user to easily select preferred images, if the images are in the range permitted in advance by a transmitter of a video stream, in a system dealing with a video stream containing a scene description.

It is another object of the invention to provide an easy parent control over scenes in a transmitted video stream which scenes are unfavorable to children from the educational viewpoint.

It is a further object of the invention to enable a user, to select some scene description for charging and counting audience rating.

It is a still further object of the invention to perform a display control of scenes other than a parent control and charging.

In order to solve the above problems, the invention provides the following configuration.

A video stream contains at least two or more scene descriptions. Of the two scene descriptions, a first scene description is used for not displaying an image which is displayed when a second scene description is selected. The first scene description is used for hiding at least a portion of an image, or may be used for displaying a different image instead of hiding a portion of or all of an image. Alternatively, the first scene description may be used for displaying a portion of an image by editing the image. An image to be displayed when the second scene description is selected may be edited. This image edition includes a display of a portion of an image, a display of a mosaic image, a display of a portion of an enlarged image, a display of a reduced image, a display of a modified image. Two or more scene descriptions may be provided if the video stream contains a violence scene or a scene which may pose some problem of copyright. A violence scene may be defined by a public institution, a video stream transmitter or reception side, or a combination thereof.

In this invention, a selector unit is provided which selects one of the two scene descriptions. One of the scene descriptions is selected in accordance with a predetermined control, a user input, or a predetermined rule.

If the scene description is selected in accordance with the user input, the first scene description may be used for a violence scene. Information on whether or not the scene is a violence scene may be added to information to be supplied from a transmitter or may be directly contained in the video stream.

In the case of the predetermined rule, the scene description may be selected in accordance with a comparison result between the information supplied from a video stream transmitter side and the information at the reception side. For example, the reception side may be supplied with the information on a permission by a copyright holder, and the scene description is determined in accordance with the information supplied from the transmitter side.

A charge for using an image may be changed in accordance with a selection of the first or second scene description. For example, the charge is free (or relatively cheap) if the first scene description is selected, whereas the charge is not free if the second scene description is selected.

The invention also includes an apparatus and method realizing the above functions and a computer program product for realizing the functions of such apparatus and method. The computer program product may include a program for adding information on a permission by a copyright holder on the transmission side, a program for selecting a scene description at the reception side, a program for performing a charging process if the charge is not free, or other programs. The program for selecting a scene may select a scene in accordance with a user input, a predetermined rule, or the like.

The invention may be described as in the following. In a video stream decoder having demultiplexing means for demultiplexing at least a video stream in order to decoding the video stream containing at least one or more object encoded visual or audio data and one or more scene descriptions which express scene contents by object encoded data, decoding means for decoding the object encoded visual data, decoding means for decoding the object encoded audio data, synthesizing means for synthesizing images corresponding to the object encoded visual data, synthesizing means synthesizing sounds corresponding to the object encoded audio data; and analyzing means for analyzing each scene description, the video stream contains at least two or more scene descriptions and the video stream decoder comprises means for selecting one of at least two or more scene descriptions and user input means for a user to enter information on a selection of the scene description. In the invention, communications means is provided which performs a communication necessary for a selection of the scene description.

DETAILED DESCRIPTION OF THE EMBODIMENTS

Embodiments of the invention will be described with reference to the accompanying drawings. Examples of video streams characterized in scene description and object coding will be described by using MPEG 4 by way of example. In the following embodiments, each object encoded stream before multiplexing is called an ES (elementary stream). ES contains scene description data, visual data, audio data, or the like. The visual data is a visual object including moving image data. In addition to the moving image data, the visual data may include still image data, CG data, 3D data, text data, animation data and the like. The visual data may also be moving image data of MPEG 1, MPEG 2, H. 261, H. 263 and the like and still image data of JPEG or the like.

Figure 1:
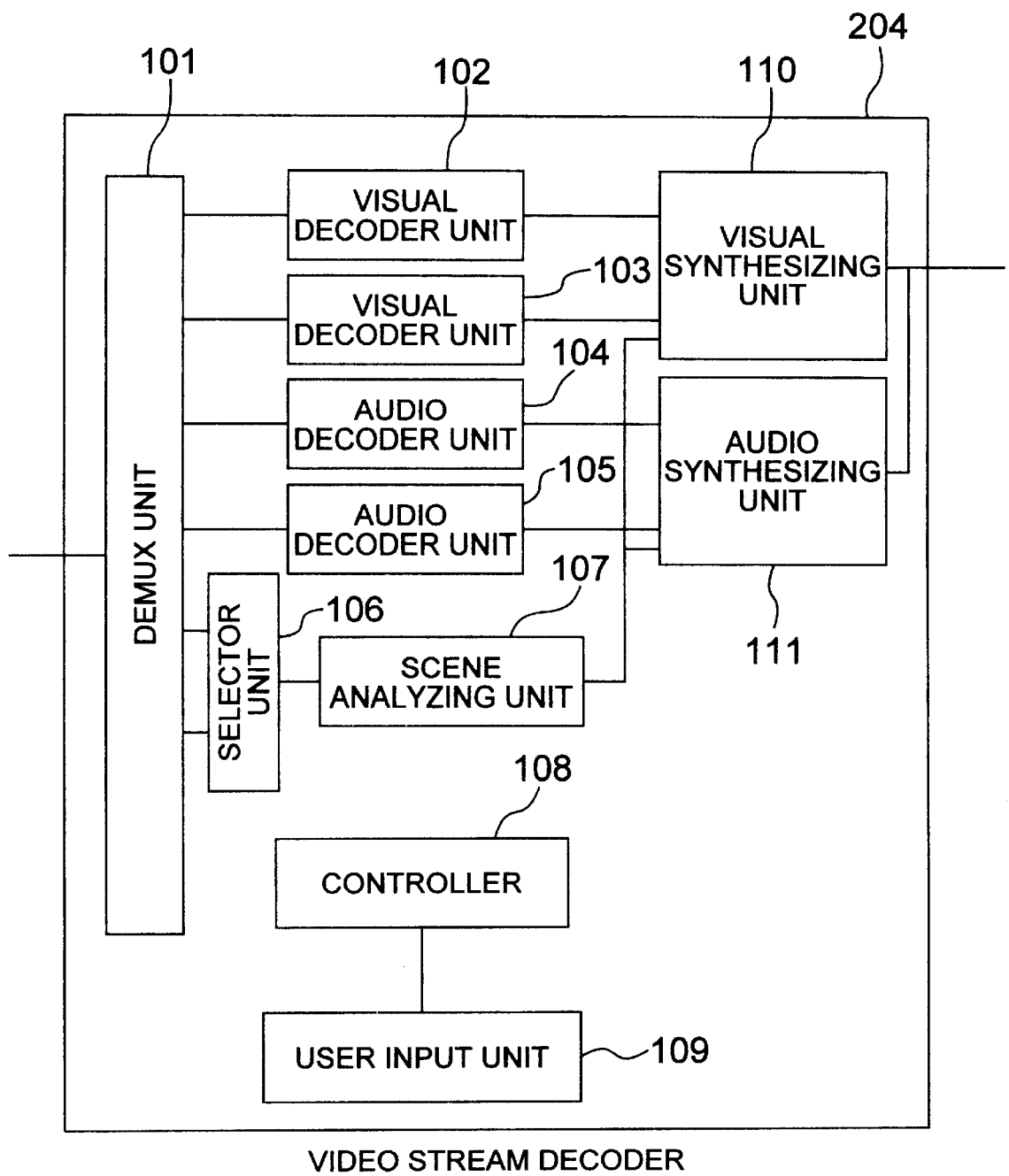
FIG. 1 is a diagram showing an example of the structure of a video stream decoder.
Figure 2:
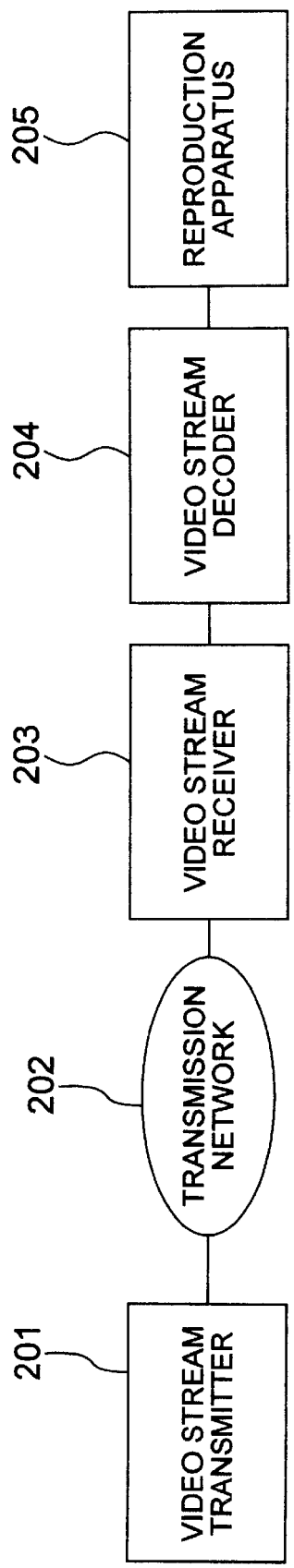
FIG. 2 is a diagram showing an example of a system configuration according to a first embodiment.

A video stream transmission/reception system according to a first embodiment of the invention will be described with reference to FIGS. 1, 2, 3, 4 and 5. Referring to FIG. 2, reference numeral 201 represents a video stream transmitter corresponding to an already existing broadcasting station, a server for Internet broadcasting, or the like. The video stream transmitter 201 transmits a video stream containing at least one or more visual or audio object encoded data and scene description. Reference numeral 202 represents a transmission network capable of transmitting a digital video stream, such as a terrestrial radio communications network, a satellite digital broadcasting network, and the Internet. Reference numeral 203 represents a video stream receiver such as an antenna and a modem capable of receiving a video stream transmitted over the transmission network 202. Reference numeral 204 represents a video stream decoder for decoding a video stream in accordance with scene description. Reference numeral 205 represents a reproduction apparatus such as a PC monitor and a television for reproducing a video stream decoded by the video stream decoder 204.

The operation of the video stream transmission/reception system shown in FIG. 2 will be described. The video stream transmitter 201 transmits a video stream of MPEG 4 which contains one or more visual or audio ES's and one or more scene description ES's. These ES's are assigned unique object numbers. It is assumed that the same object number is assigned to ES during a period while ES is valid, to thereby identify ES uniquely. Such a video stream can be formed by an optional MPEG 4 encoder.

Control information containing description or the like may be transmitted at the same time when the video stream is transmitted, the control information being representative of a relation between each scene ES and other ES's. The control information may be transmitted by using the same channel as the video stream of MPEG 4 or it may be transmitted via a channel different from that of the video stream. If the control information is not transmitted, it is assumed that the video stream transmission/reception system has already the predetermined control information representative of a relation between each scene ES and other ES's. The transmission network 202 transfers the video stream transmitted from the video stream transmitter 201 to the video stream receiver 203. This transmission network may use any means such as a terrestrial broadcasting network, a satellite broadcasting network, the Internet, and a telephone line. The video stream receiver 202 receives the video stream transmitted from the video stream transmitter 201 via the transmission network 202, and transfers the received video stream to the video stream decoder 204.

The video stream decoder 204 decodes the video stream to obtain visual data and audio data. In this case, the video stream decoder 204 decodes the video stream by using the scene description contained in the video stream. In this invention, if the scene description is allowed to be selected by a user, the video stream is decoded in accordance with the selected scene description, the detailed contents of this process being later described. The reproduction apparatus 205 reproduces the visual and audio data decoded by the video stream decoder 204.

Next, with reference to FIG. 1, the detailed operation of the video stream decoder 204 will be described. FIG. 1 shows an example of the structure of the video stream decoder. Referring to FIG. 1, reference numeral 101 represents a demultiplexer (DEMUX) unit for demultiplexing a video stream to separate it into each ES such as visual, audio, and scene description ES. Reference numerals 102 and 103 represent a visual decoder unit for decoding each visual ES to form visual data. Reference numerals 104 and 105 represent an audio decoder unit for decoding each audio ES to form audio data. Reference numeral 106 represents a selector unit for selecting a scene description. Reference numeral 107 represents a scene description analyzing unit for analyzing a scene description. Reference numeral 109 represents a user input unit such as a remote controller, buttons, and a keyboard. Reference numeral 110 represents a visual synthesizing unit for synthesizing visual data in accordance with a scene description. Reference numeral 111 represents an audio synthesizing unit for synthesizing audio data in accordance with a scene description. The above-described circuit elements are controlled by a controller 108. In this example, although two visual decoder units and two audio decoder units are used, more decoder units may be provided. If one decoder unit can process a plurality of ES's, only one decoder unit may be used. When the controller 108 supplies information to a user, the information is displayed on a display device such as a liquid crystal display and LED's if the video stream reproduction apparatus 204 has such a display device, or on the reproduction apparatus 205 if the apparatus 204 has not such a display device. In the following, a process flow in the video stream decoder will be described.

First, the DEMUX unit 101 demultiplexes an input video stream containing visual and audio ES's and scene ES's to separate the video stream into ES's. Each separated ES has a unique object number. ES's having the same object number are controlled to be decoded by the same decoder unit while ES's are valid. For example, it is definitely determined that moving image data having an object number of "0" is decoded by the visual decoder unit 102 and moving image data having an object number of "1" is decoded by the visual decoder unit 103. This control is executed by the controller 108 in accordance with the control information transmitted from the video stream transmitter 201. This control information may be transmitted by containing it in the video stream or via another channel.

If the control information is transmitted by containing it in the video stream, the control information is passed from the DEMUX unit 101 to the controller 108. If there is a scene description ES, the DEMUX unit 101 outputs it to the selector unit 106, whereas if there are scene description ES's having different object numbers, they are separately output to the selector unit 106. If the video stream contains one or more scene description, a user can select a scene by using the user input unit 109. Information selected by the user is recognized by the controller 108 so that the scene description input to the selector unit 106 can be selected. The selected scene description is analyzed by the scene description analyzing unit 107 which then supplies the control information necessary for visual and audio data synthesis to the visual synthesizing unit 110 and audio synthesizing unit 111. If the selected scene description does not use some visual or audio ES's, the controller 108 may control the decoder unit not to decode such ES's. Under the control of the controller 108, the visual decoder units 102 and 103 and audio decoder units 104 and 105 decode each ES. In accordance with control information represented by the scene description, the visual synthesizing unit 110 and audio synthesizing unit 111 synthesize visual and audio data. If the selected scene description uses only one visual ES and one audio ES, synthesizing is not executed but the visual and audio data are output directly.

Figure 3:
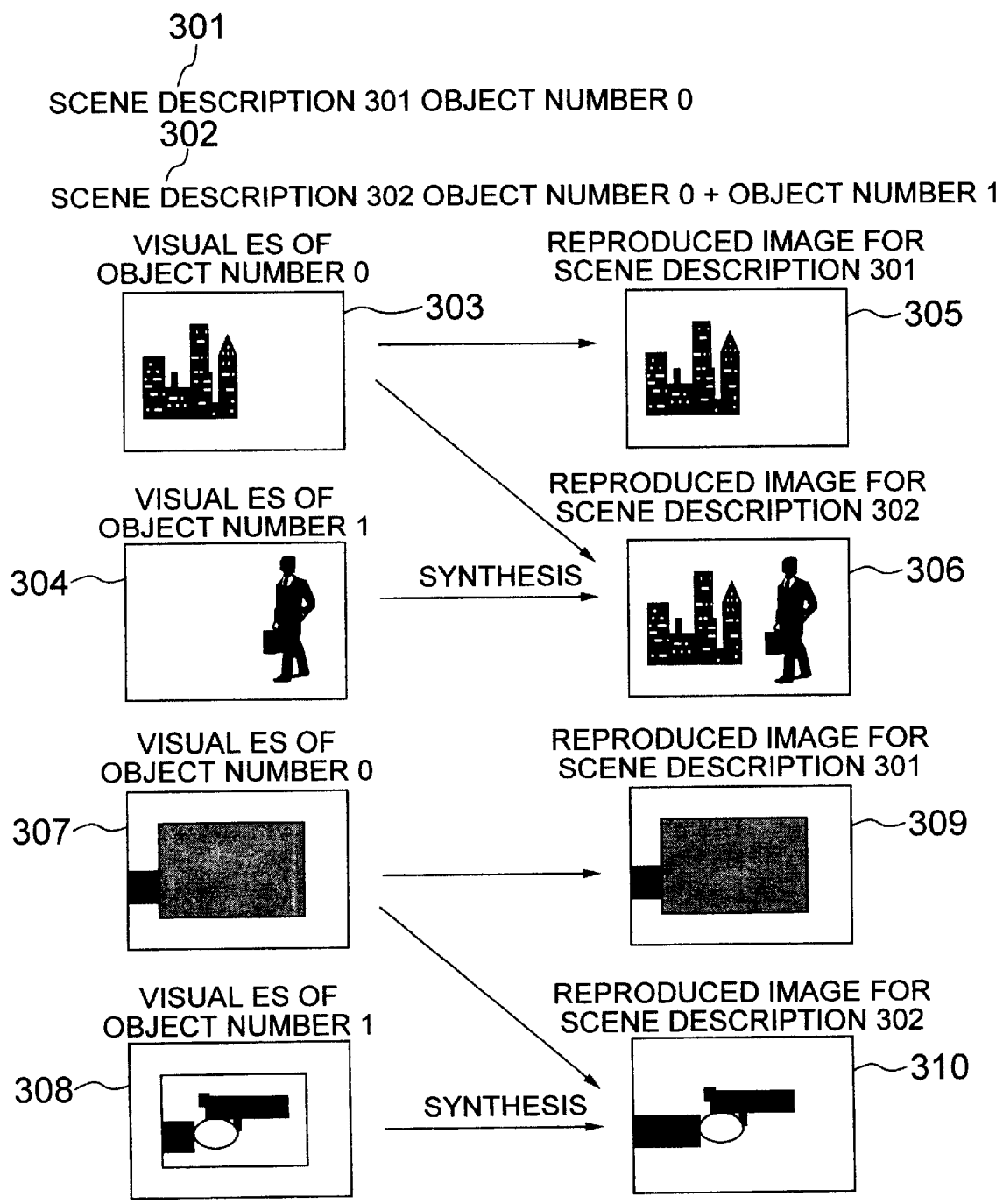
FIG. 3 is a diagram showing examples of scene description selections.

In this invention, the video stream containing no scene description is assumed to have one specific scene description. In such a case, this specific scene description may use a scene description definition determined in advance by the system, such as reproducing a visual ES having the lowest object number and an audio ES having the lowest object number. Also in this invention, each visual ES, audio ES and scene description ES contain a time stamp. Each decoder unit has a buffer so that the decoder can decode each ES at the timing indicated by the time stamp, and the visual synthesizing unit 110 and audio synthesizing unit 111 synthesize visual and audio data having the same time stamp. It is preferable that the start time of the time stamp of each ES starts from the same reference time. FIG. 3 shows an example of a video stream to be used in the video stream transmission/reception system of the first embodiment shown in FIG. 3.

Referring to FIG. 3, reference numerals 301 and 302 represent scene descriptions. It is assumed now that the scene descriptions 301 and 302 are contained in different ES's of the same video stream. Consider, for example, the case wherein a visual ES 303 having an object number of "0" and a visual ES 304 having an object number of "1" are contained in the same video stream. In this case, if the scene description 301 is selected, only an image corresponding to the visual ES 303, such as a reproduced image 305, is displayed on the reproduction apparatus 204, whereas if the scene description 302 is selected, an image synthesizing images corresponding the visual ES 303 and visual ES 304, such as a reproduced image 306, can be displayed.

Figure 4:
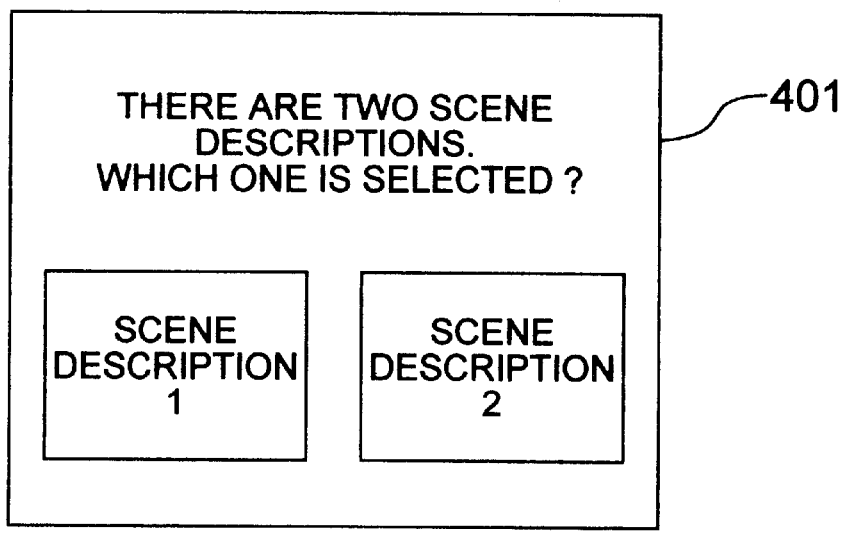
FIG. 4 is a diagram showing an example of a scene description selection dialog.
Figure 5:
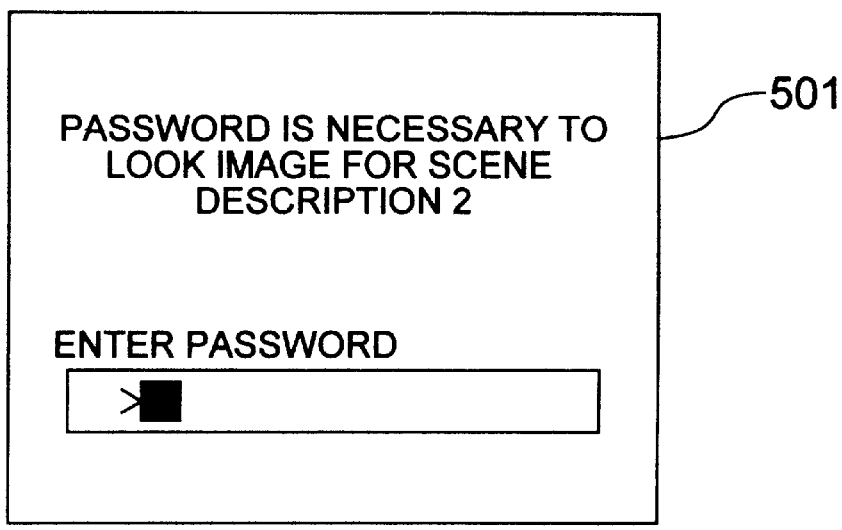
FIG. 5 is a diagram showing an example of a password input dialog.

If there are two or more scene descriptions as in this example shown in FIG. 3, the controller 108 may operate to display the tow or more scene descriptions of the reproduction apparatus 205 as shown in FIG. 4 to urge the user to select a desired scene description. The user urged by this display can select a scene description by using the input unit 109 such as a mouse. A visual ES 307 having an object number of "0" and a partial area not displayed with an image and a visual ES 308 having an object number "1" and the partial area displayed with the image can be used for displaying a synthesized image as in the above-described manner. If the contents of the image to be synthesized by the scene description 302 are unfavorable from the educational viewpoint, such as a violence scene, a reproduced image 309 of the scene description 301 may be displayed as a default, and when the scene description 302 is selected by using a selection dialog 401 such as shown in FIG. 4, a password input dialog 501 shown in FIG. 5 may be displayed.

If the password is not entered correctly, the reproduced image 310 designated by the scene description 302 cannot be obtained. It is therefore possible to prevent a user who does not know the password from looking at the scene unfavorable from the educational viewpoint. This password may be a specific password entered by a management person of the video stream decoder 204 or a password specific to the video stream decoder 204. In this embodiment, it is assumed that if there are two or more scene descriptions, a default scene description definitely determined for the system is used to display a reproduced image if no scene description is selected. For example, a default scene description may be a scene description which displays an image of ES having the smallest object number.

Figure 6:
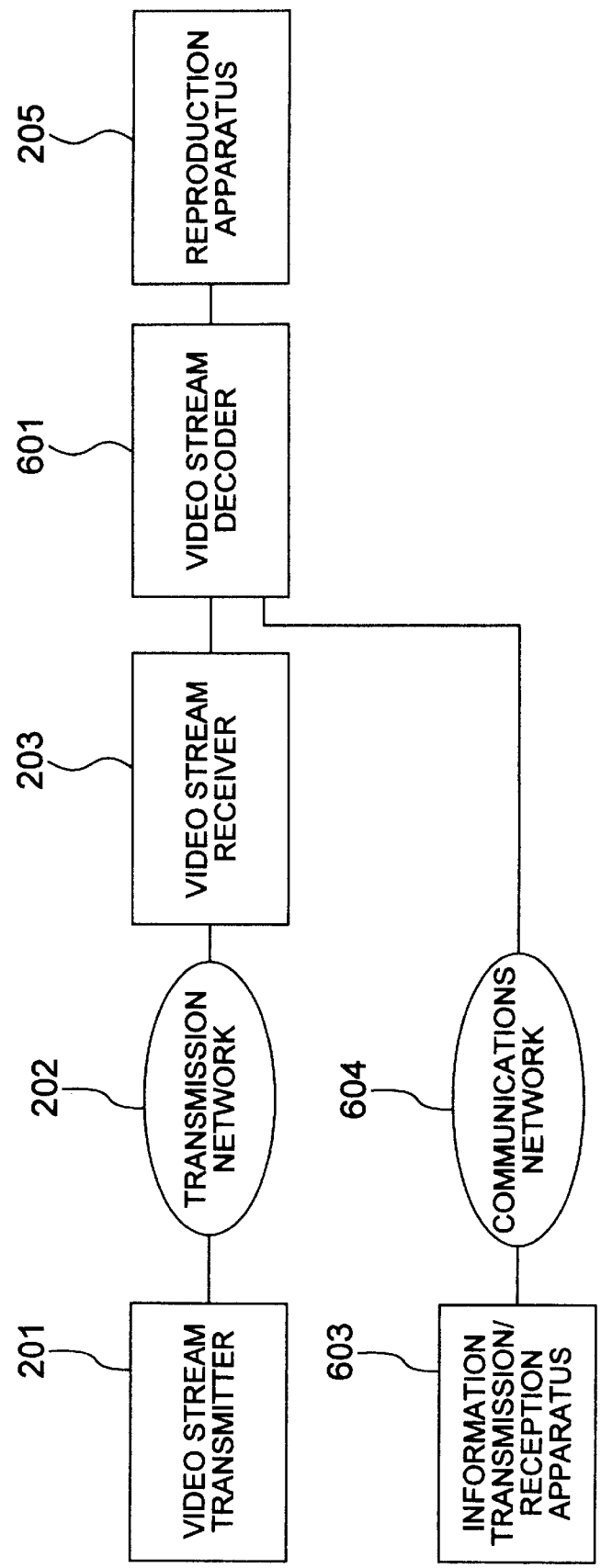
FIG. 6 is a diagram showing an example of a system configuration according to a second embodiment.

Next, the video stream transmission/reception system according to a second embodiment of the invention will be described with reference to FIGS. 6 and 7. Referring to FIG. 6, reference numeral 601 represents a video stream decoder having a communications function, reference numeral 602 represents a communications network such as the Internet and a telephone line, and reference numeral 603 represents an information transmission/reception apparatus for transmitting/receiving information to and from the video stream decoder 601. Other apparatuses similar to those of the first embodiment shown in FIG. 2 are represented by using identical reference numerals. These apparatuses have the same functions as those of the first embodiment, unless otherwise specifically described. In this embodiment, the video stream decoder 601 has the communications function. When a video stream containing one or more scene descriptions is decoded, the video stream decoder 601 communicates, if necessary, with the information transmission/reception apparatus 603 via the communications network 602 in accordance with control information. Such communication is executed, for example, when a video stream transmission broadcasting station counts the number of selections of some scene description by a user, or when it becomes necessary to charge a user who selected some scene description.

An image of ES's of an input video stream designated by one scene description may be allowed to be decoded without confirmation, and an image of ES's designated by other scene descriptions may require confirmation. In this case, it is desired that the scene description without confirmation is a default scene description. All scene descriptions may require confirmation. The video stream decoder 601 has a unique identification number which is used when communication is performed. In accordance with this identification number, the information transmission/reception apparatus 603 may identify a user and charge the user. FIG. 7 shows another video stream decoder having a communications function.

Figure 7:
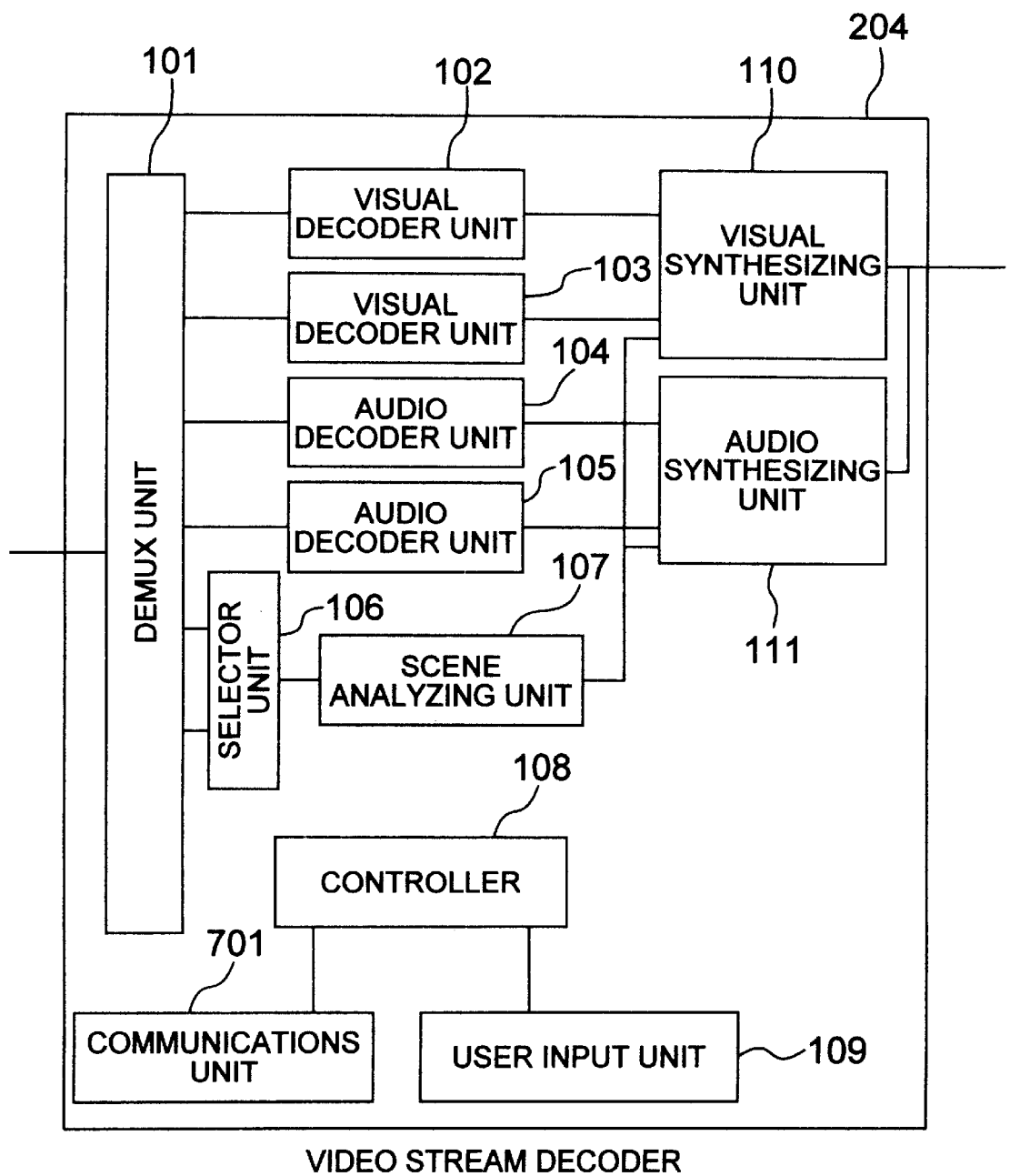
FIG. 7 is a diagram showing an example of the structure of a video stream decoder.

Referring to FIG. 7, reference numeral 701 is a communications unit such as a modem. Other reference numerals represent units having the same functions as those shown in FIG. 1 and having the identical reference numerals. When a scene description is selected by using the user input unit 109, the controller 108 passes the scene description control to the selector unit 106,. if a predetermined communication is necessary and is performed via the communications unit 701 in accordance with control information and if this communication succeeds. Instead, a communication may not be performed immediately after a scene description is selected, but the scene description selection may be executed and thereafter the communication may be performed after information necessary for the communication is collected. In this invention, if the transmission network 202 and communications network 602 are capable of bi-directional communication, e.g., if the network is constituted of the Internet or telephone network, the video stream apparatus 203 shown in FIG. 6 and the communications unit 701 shown in FIG. 7 may be the same device.

Figure 8:
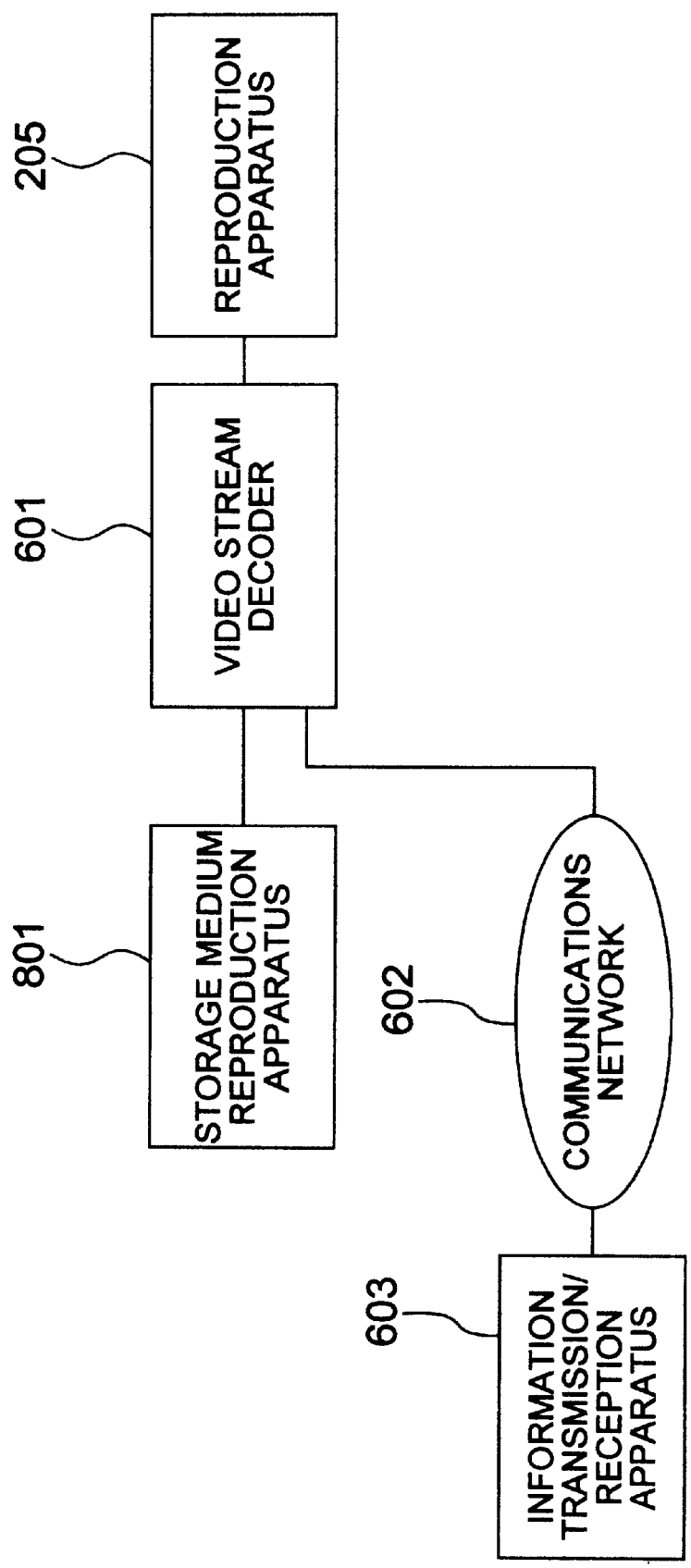
FIG. 8 is a diagram showing an example of a system configuration according to a third embodiment.

Next, the video stream transmission/reception system according to a third embodiment of the invention will be described with reference to FIG. 8. Referring to FIG. 8, reference numeral 801 represents a storage medium reproduction apparatus capable of reproducing data stored in a storage medium such as a DVD and a CD-ROM. Other apparatuses similar to those of the first and second embodiments shown in FIGS. 2 and 6 are represented by using identical reference numerals. These apparatuses have the same functions as those of the first and second embodiments, unless otherwise specifically described. The storage medium reproduction apparatus 801 reads a video stream containing at least one or more visual or audio object encoded data and scene description from a storage medium and outputs the video stream to the video stream decoder 601 which decodes the video stream, and the reproduction apparatus 205 displays a reproduced image. If there are two or more scene descriptions, the scene description can be selected and an image can be reproduced in the manner similar to the first embodiment. If a communication becomes necessary when a scene description is selected, a communication with the information transmission/reception apparatus 603 is performed and if the communication succeeds, a selection of a scene description is permitted similar to the second embodiment.

In this invention, the above-described functions of the video stream decoder 204 or 601 may be realized by software by using a general computer having a CPU, a memory and a bus.

According to the present invention, a video stream transmission/reception system dealing with a video stream containing scene description can be realized, which can easily select preferred images if the images are in the range permitted in advance by a transmitter of a video stream. It is also possible to provide an easy parent control over scenes in a transmitted video stream, which scenes are unfavorable to children from the educational viewpoint. It is also possible charge a user who selected some scene description or count the number of selections of some scene description by a user.

What is claimed is:

1. A video stream decoder, comprising:

demultiplexing means for demultiplexing a video stream containing at least one or more object encoded visual or audio data and one or more scene descriptions which express scene contents by object encoded data;

decoding means for decoding the object encoded visual or audio data;

analyzing means for analyzing each scene description; and selecting means for selecting one of the scene descriptions if the video stream contains at least two or more scenes;

user input means to be used for a user to input information, wherein said selecting means selects a scene description in accordance with an input from said user input means.

2. A video stream decoder, comprising:

demultiplexing means for demultiplexing a video stream containing at least one or more object encoded visual or audio data and one or more scene descriptions which express scene contents by object encoded data;

decoding means for decoding the object encoded visual or audio data;

analyzing means for analyzing each scene description; and selecting means for selecting one of the scene descriptions if the video stream contains at least two or more scenes;

communications means for communicating with an information transmission apparatus to receive the object encoded visual or audio data.

3. A video stream decoder, comprising:

demultiplexing means for demultiplexing a video stream containing at least one or more object encoded visual or audio data and one or more scene descriptions which express scene contents by object encoded data;

decoding means for decoding the object encoded visual or audio data; and analyzing means for analyzing each scene description;

selecting means for selecting one of the scene descriptions if the video stream contains at least two or more scenes;

wherein at least two scene descriptions include a first scene description for not decoding the object encoded visual or audio data and a second scene description for decoding the object encoded visual or audio data, and said selecting means selects one of the first and second scene descriptions.

4. A video stream decoder according to claim 3, wherein said selecting means selects one of the first and second scene descriptions in accordance with a predetermined rule.

5. A video stream decoder according to claim 4, wherein the predetermined rule selects the first scene description if a violence scene has a level higher than a predetermined level.

6. A video stream decoder according to claim 5, further comprising means for determining the predetermined level.

7. A video stream decoder according to claim 4, wherein the predetermined rule selects the second scene description if a user of the video stream decoder is permitted to look at an image corresponding to the visual data with copyright.

8. A video stream decoder according to claim 3, wherein the first scene description displays an image corresponding to the visual data by editing the visual data.

9. A video stream decoder according to claim 8, wherein the visual data is edited so as to hide a partial area of an image corresponding to the visual data.

10. A video stream decoder according to claim 8, wherein the visual data is edited so as to display an image corresponding to the visual data by enlarging or reducing the image.

11. A video stream decoder according to claim 8, wherein the visual is edited so as to display an image corresponding to the visual data by deforming the image.

12. A video stream decoder according to claim 4, further comprising means for changing a charge for the visual or audio data in accordance with which one of the first and second scene descriptions is selected.

13. A video stream decoding method comprising the steps of:
   demultiplexing means for demultiplexing a video stream containing at least one or more object encoded visual or audio data and one or more scene descriptions which express scene contents by object encoded data;
   selecting either a first scene description for not decoding the object encoded visual or audio data of the video stream or a second scene description for decoding the object encoded visual or audio data; and
   decoding the object encoded visual or audio data in accordance with the selected second scene description.

14. A video stream decoding method according to claim 13, wherein the first scene description is used for hiding a partial area of an image corresponding to the visual data.

15. A video stream decoding method according to claim 13, wherein a charge for the visual or audio data is changed in accordance with which one of the first and second scene descriptions is selected.

16. A program product capable of being read with a computer, the program product making the computer realize the steps of:
   demultiplexing means for demultiplexing a video stream containing at least one or more object encoded visual or audio data and one or more scene descriptions which express scene contents by object encoded data;
   analyzing each scene description and selecting either a first scene description for not decoding the object encoded visual or audio data of the video stream or a second scene description for decoding the object encoded visual or audio data in accordance with an analysis result and an input by a user using the computer; and
   decoding the object encoded visual or audio data in accordance with the selected second scene description.

17. A program installed in a computer for execution therein including a computer-readable plurality code corresponding to the steps of:
   demultiplexing means for demultiplexing a video stream containing at least one or more object encoded visual or audio data and one or more scene descriptions which express scene contents by object encoded data;
   analyzing each scene description and selecting either a first scene description for not decoding the object encoded visual or audio data of the video stream or a second scene description for decoding the object encoded visual or audio data in accordance with an analysis result and an input by a user using the computer; and
   decoding the object encoded visual or audio data in accordance with the selected second scene description.

* * * * *